(12) United States Patent
Yoo et al.

(10) Patent No.: US 10,425,183 B2
(45) Date of Patent: Sep. 24, 2019

(54) OPTICAL TRANSMISSION METHOD AND APPARATUS

(71) Applicant: ELECTRONICS AND TELECOMMUNICATIONS RESEARCH INSTITUTE, Daejeon (KR)

(72) Inventors: Sanghwa Yoo, Daegu (KR); Sae-Kyoung Kang, Daejeon (KR); Joon Ki Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 10 days.

(21) Appl. No.: 16/010,745

(22) Filed: Jun. 18, 2018

(65) Prior Publication Data

US 2019/0052394 A1 Feb. 14, 2019

(30) Foreign Application Priority Data

Sep. 19, 2017 (KR) .................. 10-2017-0120671
Dec. 8, 2017 (KR) .................. 10-2017-0168155

(51) Int. Cl.
*H04J 14/06* (2006.01)
*H04J 14/02* (2006.01)
*G02B 6/12* (2006.01)

(52) U.S. Cl.
CPC .......... *H04J 14/06* (2013.01); *G02B 6/12004* (2013.01); *H04J 14/02* (2013.01)

(58) Field of Classification Search
CPC ........ H04J 14/02; H04J 14/06; G02B 6/12004
See application file for complete search history.

(56) References Cited

U.S. PATENT DOCUMENTS

| | | | |
|---|---|---|---|
| 7,231,105 B2 | 6/2007 | Gunn, III et al. | |
| 7,259,031 B1* | 8/2007 | Dickinson | B82Y 20/00 438/23 |
| 2006/0120664 A1 | 6/2006 | Lee et al. | |
| 2010/0158427 A1 | 6/2010 | Choi et al. | |
| 2014/0036937 A1* | 2/2014 | Doerr | H04B 10/40 370/535 |
| 2016/0119057 A1* | 4/2016 | Mekis | H04J 14/02 398/51 |
| 2017/0163369 A1 | 6/2017 | Welch | |

OTHER PUBLICATIONS

Matthew Streshinsky et al., "A compact bi-wavelength polarization splitting grating coupler fabricated in a 220 nm SOI platform", 2013 Optical Society of America, Dec. 2013, vol. 21, No. 25, Optics Express.

* cited by examiner

*Primary Examiner* — Casey L Kretzer
(74) *Attorney, Agent, or Firm* — LRK Patent Law Firm

(57) ABSTRACT

An optical transmission method includes outputting a first light based on a first electronic signal, outputting a second light based on a second electronic signal, and polarizing and combining the first light and the second light, and outputting the polarized and combined first and second lights to an optical fiber.

18 Claims, 8 Drawing Sheets

200

OPTICAL TRANSMISSION METHOD AND APPARATUS

CROSS-REFERENCE TO RELATED APPLICATIONS

This application claims the priority benefit of Korean Patent Application No. 10-2017-0120671, filed Sep. 19, 2017, and Korean Patent Application No. 10-2017-0168155, filed Dec. 8, 2017, in the Korean Intellectual Property Office, the disclosures of which are incorporated herein by reference for all purposes.

BACKGROUND

1. Field

One or more example embodiments relate to an optical transmission method and apparatus.

2. Description of Related Art

Recently, with the growing demand for integration of optical transceivers, silicon photonics technology stands out. The silicon photonics technology is a combination of silicon semiconductor technology and photonics technology and has an advantage of high speed operation and low-cost mass production. The silicon photonics technology may include, for example, microwave photonics, a lidar, a bio sensor, a high-speed interconnection, an on-chip spectroscopy, and a solar energy application.

In detail, in the silicon photonics technology, optical elements may be manufactured by being disposed on a silicon photonics die. Lights output from an external light source may be input into the optical elements implemented on the silicon photonics die. In this example, depending on design features of the optical elements, the lights passing through the optical elements may be propagated in a transverse electric (TE) mode or a transverse magnetic (TM) mode.

SUMMARY

According to an aspect, there is provided an optical transmission method including outputting a first light based on a first electronic signal, outputting a second light based on a second electronic signal, and orthogonally polarizing and combining the first light and the second light, and outputting the orthogonally polarized and combined first and second lights to an optical fiber.

The polarizing, combining and outputting may include combining the first light and the second light by performing wavelength-division multiplexing (WDM) using a first optical combining element and outputting the combined first and second lights, and orthogonally polarizing and combining the combined first and second lights, and outputting the orthogonally polarized and combined first and second lights to the optical fiber. The first light and the second light may have different wavelengths.

At least one of the first light and the second light may include a single-wavelength light.

At least one of the first light and the second light may include a multi-wavelength light.

The optical transmission method may further include outputting the multi-wavelength light by performing WDM using a second optical combining element.

The second optical combining element may be implemented as an arrayed waveguide grating (AWG).

The second optical combining element may be implemented as a power coupler.

The power coupler may be implemented as a directional coupler (DC).

The power coupler may be implemented as a multimode interference coupler (MMIC).

The polarizing, combining and outputting may include performing the polarizing and combining using a two-dimensional (2D) grating coupler.

According to an aspect, there is provided an optical transmission apparatus including a first electro-optical signal processing system configured to output a first light based on a first electronic signal, a second electro-optical signal processing system configured to output a second light based on a second electronic signal, a waveguide configured to transmit the first light and the second light, and a polarizing and combining element configured to orthogonally polarize and combine the first light and the second light received from the waveguide and output the orthogonally polarized and combined first and second lights to an optical fiber.

The optical transmission apparatus may further include a first optical combining element configured to combine the first light and the second light by performing WDM and outputting the combined first and second lights to the polarizing and combining element. The polarizing and combining element may be configured to orthogonally polarize and combine the combined first and second lights, and output the orthogonally polarized and combined first and second lights to the optical fiber, and the first light and the second light may have different wavelengths.

At least one of the first light and the second light may include a single-wavelength light.

At least one of the first light and the second light may include a multi-wavelength light.

The optical transmission apparatus may further include a second optical combining element configured to output the multi-wavelength light by performing WDM.

The second optical combining element may be implemented as an AWG.

The second optical combining element may be implemented as a power coupler.

The power coupler may be implemented as a DC.

The power coupler may be implemented as an MMIC.

The polarizing and combining element may be implemented as a 2D grating coupler.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
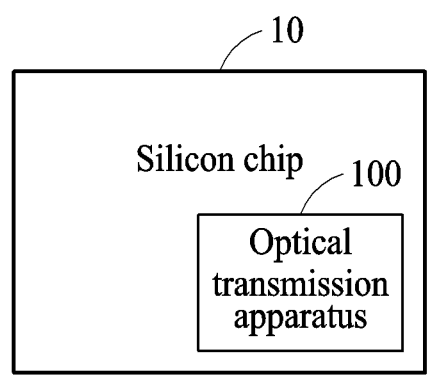
FIG. 1 is a block diagram illustrating an optical transmission system according to an example embodiment.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to the example embodiments, examples of which are illustrated in the accompanying drawings, wherein like reference numerals refer to the like elements throughout.

Figure 2:
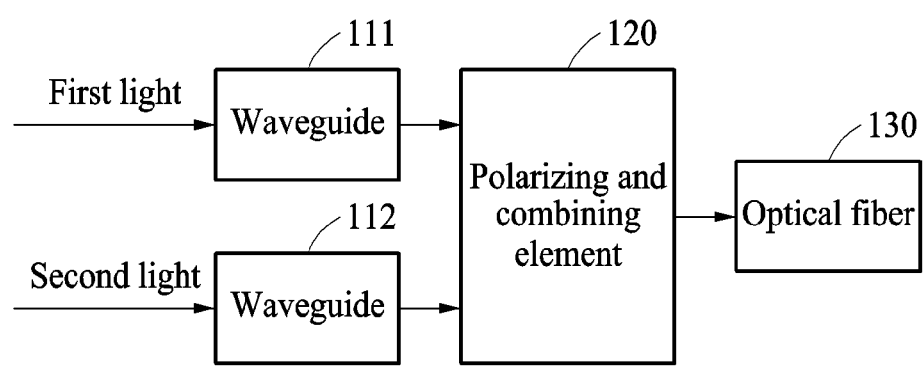
FIG. 2 is a block diagram illustrating an example of an optical transmission apparatus of FIG. 1.

FIG. 1 is a block diagram illustrating an optical transmission system according to an example embodiment, and FIG. 2 is a block diagram illustrating an example of an optical transmission apparatus of FIG. 1.

Referring to FIGS. 1 and 2, an optical transmission system may include a silicon chip 10 and an optical transmission apparatus 100. In this example, the optical transmission apparatus 100 may be disposed on the silicon chip 10. That is, the optical transmission apparatus 100 may transmit a light on the silicon chip 10.

The optical transmission apparatus 100 may include waveguides 111 and 112, a polarizing and combining element 120, and an optical fiber 130.

The waveguides 111 and 112 may be light wave transmission lines formed of silicon, and may propagate lights. The waveguides 111 and 112 may have different configurations depending on modes in which the lights are propagated, for example, a transverse electric (TE) mode and a transverse magnetic (TM) mode.

The waveguide 111 may transmit, to the polarizing and combining element 120, a first light passing through a light source and an electro-optical signal processing system. The waveguide 112 may transmit, to the polarizing and combining element 120, a second light passing through the light source and the electro-optical signal processing system.

The polarizing and combining element 120 may orthogonally polarize and combine the first light and the second light. For example, the polarizing and combining element 120 may be implemented as a two-dimensional (2D) grating coupler. The optical transmission apparatus 100 may reduce a loss of optical power using the polarizing and combining element 120. Through the above structure, an issue of reduction in power by 3 dB when using an existing combining-only element, for example, an optical coupler, for wavelength-division multiplexing (WDM) may be solved.

The polarizing and combining element 120 may output the first light and the second light to be propagated while being perpendicular (or orthogonal) to each other in an optical fiber 130. For example, the polarizing and combining element 120 may propagate the first light as an X polarized light and the second light as a Y polarized light in the optical fiber 130. That is, the first light propagated by the waveguide 111 in the TE mode or the TM mode may pass through the polarizing and combining element 120 and be propagated as the X polarized light in the optical fiber 130. Further, the second light propagated by the waveguide 112 in the TE mode or the TM mode may pass through the polarizing and combining element 120 and be propagated as the Y polarized light in the optical fiber 130.

A plurality of lights may include the first light and the second light. In this example, the first light and the second light may include single-wavelength lights or multi-wavelength lights.

Figure 4:
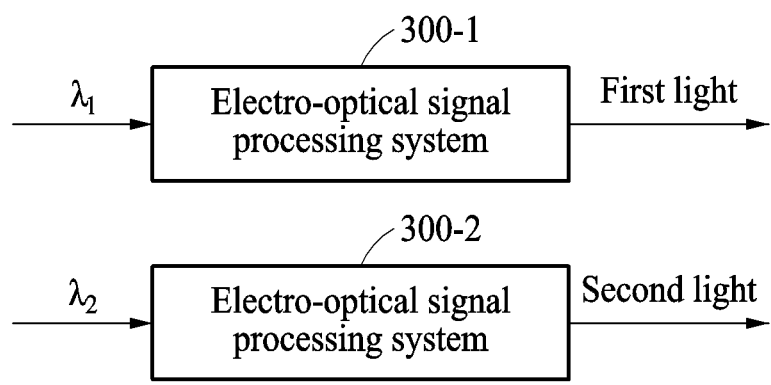
FIG. 4 is a diagram illustrating an example to describe a first light and a second light.
Figure 5:
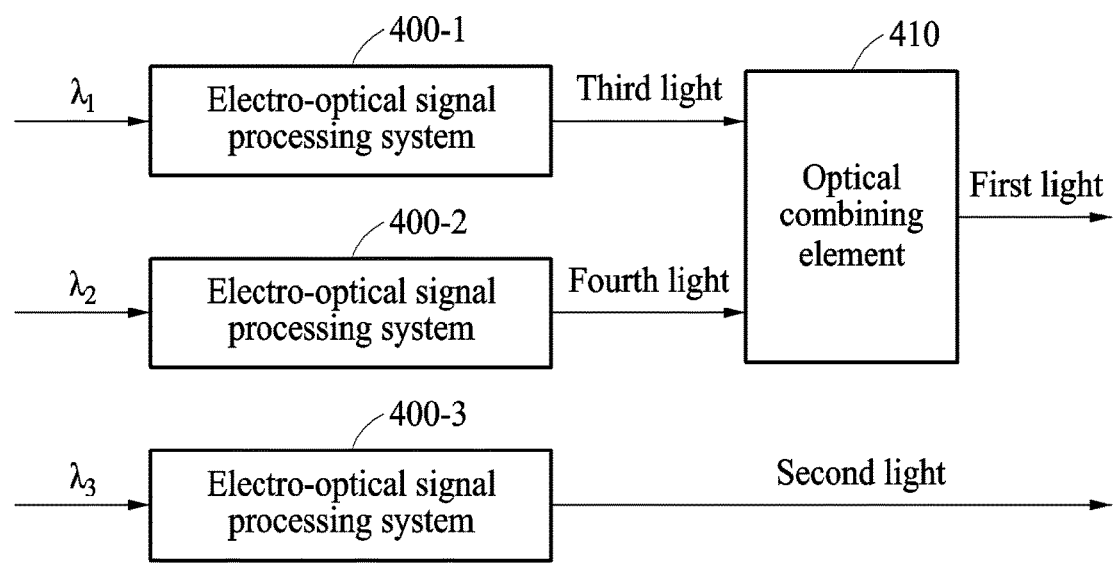
FIG. 5 is a diagram illustrating another example to describe a first light and a second light.

For example, a case in which at least one of the first light and the second light includes a single-wavelength light is as shown in FIGS. 4 and 5. In a case in which both the first light and the second light include single-wavelength lights, the first light and the second light may have different wavelengths.

Figure 6:
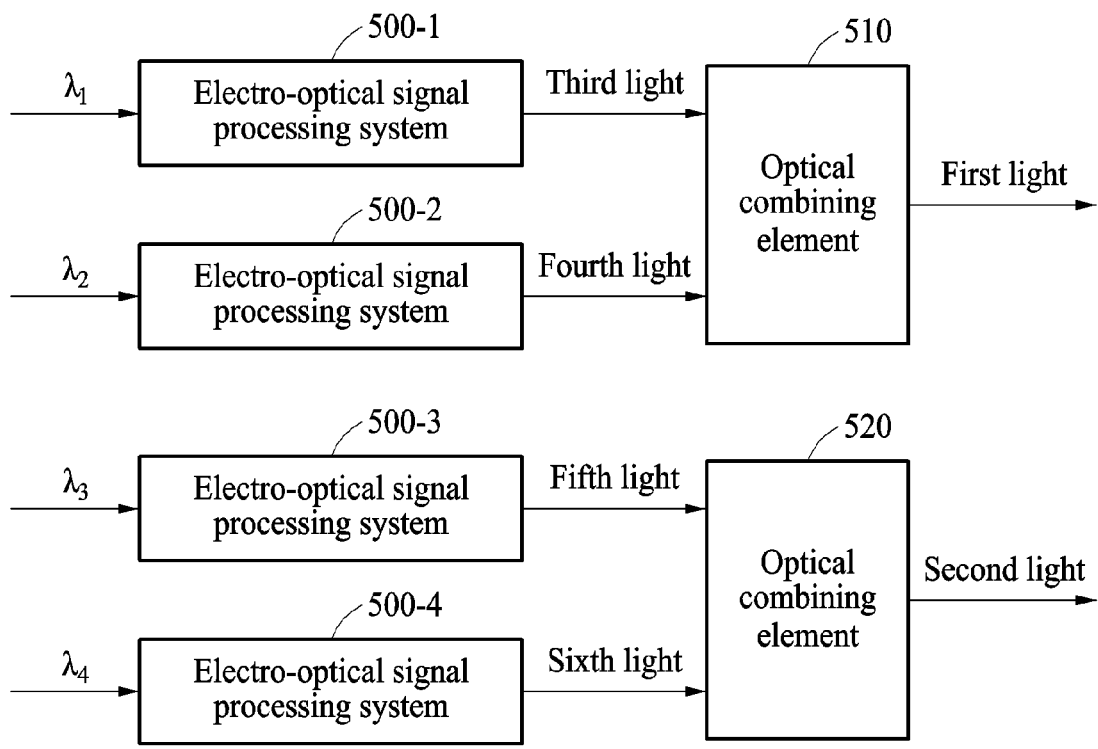
FIG. 6 is a diagram illustrating still another example to describe a first light and a second light.

In another example, a case in which at least one of the first light and the second light includes a multi-wavelength light is as shown in FIGS. 5 and 6. In a case in which both the first light and the second light include multi-wavelength lights, the first light and the second light may have the same wavelength or different wavelengths.

Figure 3:
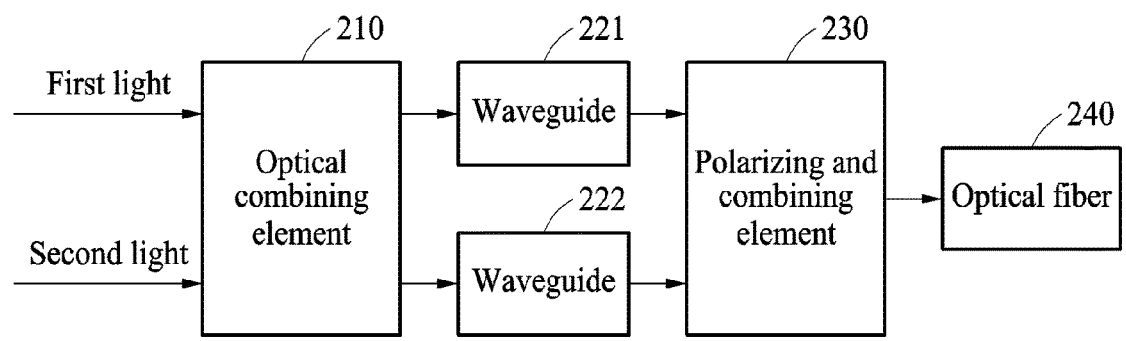
FIG. 3 is a block diagram illustrating another example of the optical transmission apparatus of FIG. 1.

FIG. 3 is a block diagram illustrating another example of the optical transmission apparatus of FIG. 1.

Referring to FIG. 3, an optical transmission apparatus 200 may include an optical combining element 210, waveguides 221 and 222, a polarizing and combining element 230, and an optical fiber 240. The waveguides 221 and 222, the polarizing and combining element 230, and the optical fiber 240 of FIG. 3 may be substantially the same as the waveguides 111 and 112, the polarizing and combining element 120, and the optical fiber 130 of FIG. 2 in terms of configuration and operation. That is, the optical transmission apparatus 200 of FIG. 3 may correspond to the optical transmission apparatus 100 of FIG. 2 further including the optical combining element 210.

The optical combining element 210 may combine a first light and a second light. For example, the optical combining element 210 may perform WDM on the first light and the second light. The optical combining element 210 may be a 2×2 optical combining element. That is, the optical combining element 210 may include two input terminals and two output terminals. The optical combining element 210 may also be referred to as a first optical combining element so as to be distinguished from an optical combining element 410 of FIG. 5, optical combining elements 510 and 520 of FIG. 6, and optical combining elements 630 and 640 of FIG. 7. Each of the optical combining element 410 of FIG. 5, the optical combining elements 510 and 520 of FIG. 6, and the optical combining elements 630 and 640 of FIG. 7 may also be referred to as a second optical combining element. The first optical combining element may be a 2×2 optical combining element, and the second optical combining element may be a 2×1 optical combining element.

The optical combining element 210 may output the combined lights. For example, in a case in which the wavelength of the first light is $\lambda_1$ and the wavelength of the second light is $\lambda_2$, the optical combining element 210 may output lights with a wavelength $\lambda_1+\lambda_2$ to respective output terminals. That is, the waveguides 221 and 222 may propagate the lights with the wavelength $\lambda_1+\lambda_2$ to the polarizing and combining element 230.

The polarizing and combining element 230 may output the two lights with the wavelength $\lambda_1+\lambda_2$ to be propagated while being perpendicular to each other in the optical fiber 240. For example, the polarizing and combining element 230 may propagate the two lights with the wavelength $\lambda_1+\lambda_2$ as an X polarized light and a Y polarized light, respectively.

The polarizing and combining element 230 may be implemented as an arrayed waveguide grating (AWG) or a power coupler. In a case in which the polarizing and combining element 230 is implemented as the power coupler, the power coupler may be implemented as a directional coupler (DC) or a multimode interference coupler (MMIC).

The optical transmission apparatus 200 may prevent an optical power difference occurring between the first light and the second light using the optical combining element 210 and the polarizing and combining element 230 although the optical fiber 240 is not exactly optically aligned with the polarizing and combining element 230.

FIG. 4 is a diagram illustrating an example to describe a first light and a second light.

Referring to FIG. 4, a configuration of combining two wavelengths is shown.

An electro-optical signal processing system 300-1 may output a first light with a wavelength $\lambda_1$ based on a first electronic signal. The first electronic signal may include information for the electro-optical signal processing system 300-1 to output the first light with the wavelength $\lambda_1$.

Further, an electro-optical signal processing system 300-2 may output a second light with a wavelength $\lambda_2$ based on a second electronic signal. The second electronic signal may include information for the electro-optical signal processing system 300-2 to output the second light with the wavelength $\lambda_2$.

That is, the first light and the second light include different single-wavelength lights.

The electro-optical signal processing systems 300-1 and 300-2 may propagate the first light and the second light to an optical transmission apparatus. The optical transmission apparatus may be as shown in FIG. 2 or 3. The first light and the second light including different single-wavelength lights may be combined by the optical transmission apparatus.

FIG. 5 is a diagram illustrating another example to describe a first light and a second light.

Referring to FIG. 5, a configuration of combining three wavelengths is shown.

An electro-optical signal processing system 400-1 may output a third light with a wavelength $\lambda_1$ based on a first electronic signal. The first electronic signal may include information for the electro-optical signal processing system 400-1 to output the third light with the wavelength $\lambda_1$.

Further, an electro-optical signal processing system 400-2 may output a fourth light with a wavelength $\lambda_2$ based on a second electronic signal. The second electronic signal may include information for the electro-optical signal processing system 400-2 to output the fourth light with the wavelength $\lambda_2$.

An optical combining element 410 may output a first light by combining the third light and the fourth light. For example, the optical combining element 410 may output the first light by performing WDM on the third light and the fourth light. The optical combining element 410 may be a 2×1 optical combining element. That is, the optical combining element 410 may include two input terminals and a single output terminal.

An electro-optical signal processing system 400-3 may output a second light with a wavelength $\lambda_3$ based on a third electronic signal. The third electronic signal may include information for the electro-optical signal processing system 400-3 to output the second light with the wavelength $\lambda_3$.

That is, the first light may include a multi-wavelength light. The second light may include a single-wavelength light. Thus, the first light and the second light may have different wavelengths.

The second light may not pass through the optical combining element 410, and thus have a greater power than the first light. Accordingly, by performing doping on a waveguide that propagates the second light and applying a voltage thereto, the power of the first light and the power of the second light may be matched.

The optical combining element 410 and the electro-optical signal processing system 400-3 may propagate the first light and the second light to an optical transmission apparatus. The optical transmission apparatus may be as shown in FIG. 2 or 3. The first light and the second light including lights with different wavelengths may be combined by the optical transmission apparatus.

FIG. 6 is a diagram illustrating still another example to describe a first light and a second light.

Referring to FIG. 6, a configuration of combining four wavelengths is shown.

An electro-optical signal processing system 500-1 may output a third light with a wavelength $\lambda_1$ based on a first electronic signal. The first electronic signal may include information for the electro-optical signal processing system 500-1 to output the third light with the wavelength $\lambda_1$.

Further, an electro-optical signal processing system 500-2 may output a fourth light with a wavelength $\lambda_2$ based on a second electronic signal. The second electronic signal may include information for the electro-optical signal processing system 500-2 to output the fourth light with the wavelength $\lambda_2$.

An optical combining element 510 may output a first light by combining the third light and the fourth light. For example, the optical combining element 510 may output the first light by performing WDM on the third light and the fourth light. The optical combining element 510 may be a 2×1 optical combining element. That is, the optical combining element 510 may include two input terminals and a single output terminal.

An electro-optical signal processing system 500-3 may output a fifth light with a wavelength $\lambda_3$ based on a third electronic signal. The third electronic signal may include information for the electro-optical signal processing system 500-3 to output the fifth light with the wavelength $\lambda_3$.

Further, an electro-optical signal processing system 500-4 may output a sixth light with a wavelength $\lambda_4$ based on a fourth electronic signal. The fourth electronic signal may include information for the electro-optical signal processing system 500-4 to output the sixth light with the wavelength $\lambda_4$.

An optical combining element 520 may output a second light by combining the fifth light and the sixth light. For example, the optical combining element 520 may output the second light by performing WDM on the fifth light and the sixth light. The optical combining element 520 may be a 2×1 optical combining element. That is, the optical combining element 520 may include two input terminals and a single output terminal.

That is, the first light and the second light may include multi-wavelength lights. The first light and the second light may have different wavelengths.

The optical combining elements 510 and 520 may propagate the first light and the second light to an optical transmission apparatus. The optical transmission apparatus may be as shown in FIG. 2 or 3. The first light and the second light with different wavelengths may be combined by the optical transmission apparatus.

Figure 7:
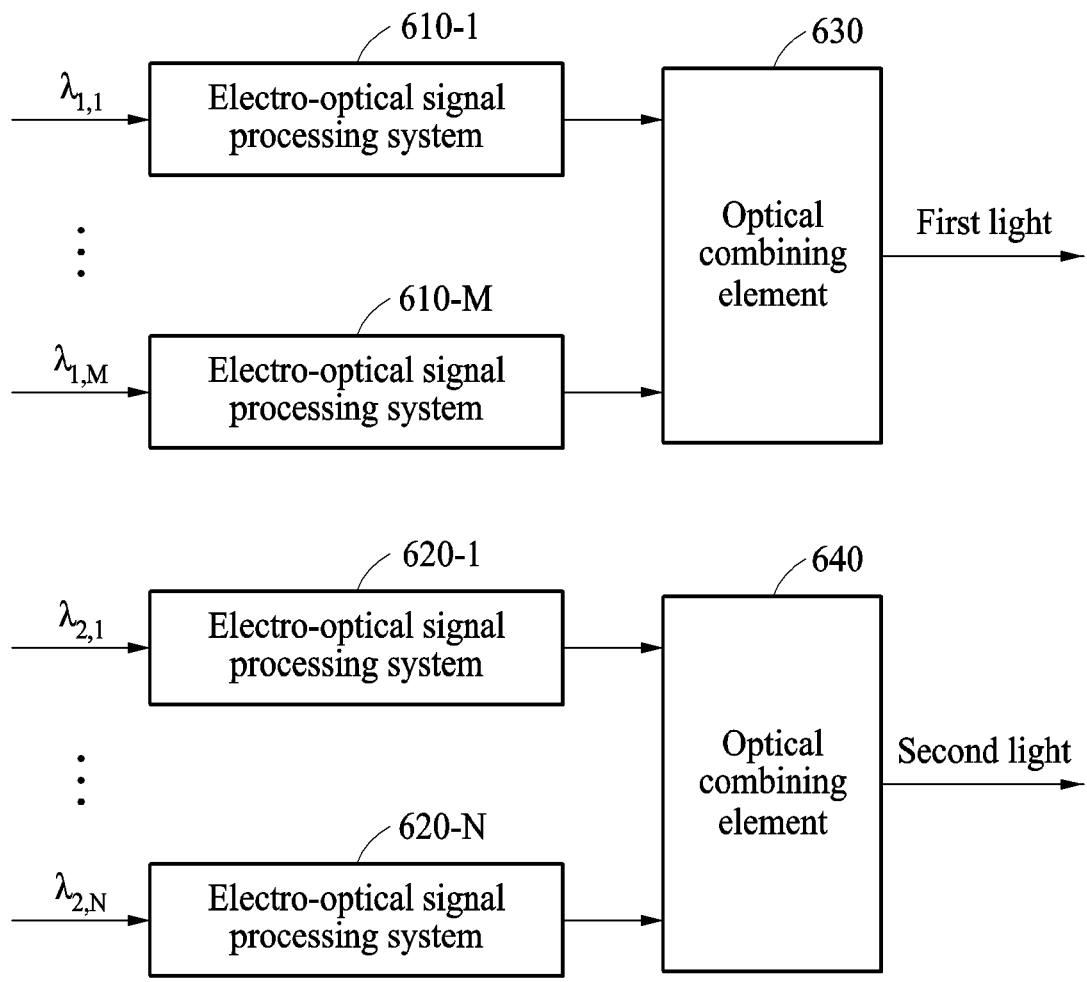
FIG. 7 is a diagram illustrating further another example to describe a first light and a second light.

FIG. 7 is a diagram illustrating further another example to describe a first light and a second light.

Referring to FIG. 7, a configuration of combining a plurality of wavelengths is shown.

An electro-optical signal processing system 610-1 may output a light with a wavelength $\lambda_{1,1}$ based on a first electronic signal. The first electronic signal may include information for the electro-optical signal processing system 610-1 to output the light with the wavelength $\lambda_{1,1}$.

Further, an electro-optical signal processing system 610-M may output a light with a wavelength $\lambda_{1,M}$ based on a second electronic signal. The second electronic signal may include information for the electro-optical signal processing system 610-M to output the light with the wavelength $\lambda_{1,M}$.

An optical combining element 630 may output a first light by combining M lights from the light with the wavelength $\lambda_{1,1}$ to the light with the wavelength $\lambda_{1,M}$. For example, the optical combining element 630 may output the first light by performing WDM on the M lights. The optical combining element 630 may be an M×1 optical combining element. That is, the optical combining element 630 may include M input terminals and a single output terminal.

An electro-optical signal processing system 620-1 may output a light with a wavelength $\lambda_{2,1}$ based on a third electronic signal. The third electronic signal may include information for the electro-optical signal processing system 620-1 to output the light with the wavelength $\lambda_{2,1}$.

Further, an electro-optical signal processing system 620-N may output a light with a wavelength $\lambda_{2,N}$ based on a fourth electronic signal. The fourth electronic signal may include information for the electro-optical signal processing system 620-N to output the light with the wavelength $\lambda_{2,N}$.

An the optical combining element 640 may output a second light by combining N lights from the light with the wavelength $\lambda_{2,1}$ to the light with the wavelength $\lambda_{2,N}$. For example, the optical combining element 640 may output the second light by performing WDM on the N lights. The optical combining element 640 may be an N×1 optical combining element. That is, the optical combining element 640 may include N input terminals and a single output terminal.

That is, the first light and the second light may include multi-wavelength lights. The first light and the second light may have different wavelengths.

The optical combining elements 630 and 640 may propagate the first light and the second light to an optical transmission apparatus. The optical transmission apparatus may be as shown in FIG. 2 or 3. The first light and the second light including lights with different wavelengths may be combined by the optical transmission apparatus.

As described with reference to FIGS. 4 through 7, the optical transmission apparatus according to an embodiment may combine and/or polarize and combine a plurality of wavelengths.

Figure 8:
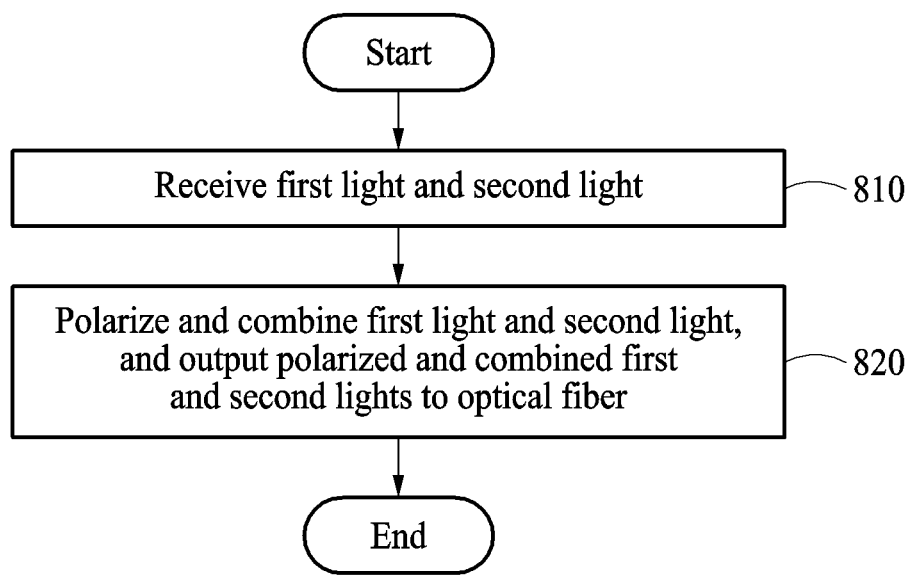
FIG. 8 is a flowchart illustrating an optical transmission method according to an example embodiment.

FIG. 8 is a flowchart illustrating an optical transmission method according to an example embodiment.

Referring to FIG. 8, in operation 810, an optical transmission apparatus may receive a first light and a second light. In this example, the first light and the second light may be propagated using waveguides. The first light and the second light may include single-wavelength lights or multi-wavelength lights.

In operation 820, the optical transmission apparatus may orthogonally polarize and combine the first light and the second light, and output the orthogonally polarized and combined first and second lights to an optical fiber. That is, the optical transmission apparatus may include a polarizing and combining element. The first light and the second light passing through the polarizing and combining element may be propagated while being perpendicular to each other in the optical fiber.

In this example, the optical transmission apparatus may further include an optical combining element. The optical combining element may output a multi-wavelength light to the polarizing and combining element by performing WDM. For example, the optical combining element may be implemented as an AWG or a power coupler. The power coupler may be implemented as a DC or an MMIC.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transmission method comprising:
   outputting a first light based on a first electronic signal;
   outputting a second light based on a second electronic signal; and
   orthogonally polarizing and combining the first light and the second light, and outputting the orthogonally polarized and combined first and second lights to an optical fiber,
   wherein the polarizing, combining and outputting comprises:
   combining the first light and the second light by performing wavelength-division multiplexing (WDM) using a first optical combining element and outputting a plurality of combined first and second lights; and
   orthogonally polarizing and combining the plurality of combined first and second lights, and outputting the orthogonally polarized and combined first and second lights to the optical fiber,
   wherein the first light and the second light have different wavelengths.

2. The optical transmission method of claim 1, wherein at least one of the first light and the second light includes a single-wavelength light.

3. The optical transmission method of claim 1, wherein at least one of the first light and the second light includes a multi-wavelength light.

4. The optical transmission method of claim 3, further comprising:
   outputting the multi-wavelength light by performing WDM using a second optical combining element.

5. The optical transmission method of claim 4, wherein the second optical combining element is implemented as an arrayed waveguide grating (AWG).

6. The optical transmission method of claim 4, wherein the second optical combining element is implemented as a power coupler.

7. The optical transmission method of claim 6, wherein the power coupler is implemented as a directional coupler (DC).

8. The optical transmission method of claim 6, wherein the power coupler is implemented as a multimode interference coupler (MMIC).

9. The optical transmission method of claim 1, wherein the polarizing, combining and outputting comprises performing the polarizing and combining using a two-dimensional (2D) grating coupler.

10. An optical transmission apparatus comprising:
    a first electro-optical signal processing system configured to output a first light based on a first electronic signal;
    a second electro-optical signal processing system configured to output a second light based on a second electronic signal;
    a first optical combining element configured to combine the first light and the second light by performing wavelength-division multiplexing (WDM) and outputting a plurality of combined first and second lights via waveguides, and a polarizing and combining element configured to orthogonally polarize and combine the plurality of combined first and second lights received from the waveguides and output the orthogonally polarized and combined first and second lights to an optical fiber;
wherein the first light and the second light have different wavelengths.

11. The optical transmission apparatus of claim 10, wherein at least one of the first light and the second light includes a single-wavelength light.

12. The optical transmission apparatus of claim 10, wherein at least one of the first light and the second light includes a multi-wavelength light.

13. The optical transmission apparatus of claim 12, further comprising:
a second optical combining element configured to output the multi-wavelength light by performing WDM.

14. The optical transmission apparatus of claim 13, wherein the second optical combining element is implemented as an arrayed waveguide grating (AWG).

15. The optical transmission apparatus of claim 13, wherein the second optical combining element is implemented as a power coupler.

16. The optical transmission apparatus of claim 15, wherein the power coupler is implemented as a directional coupler (DC).

17. The optical transmission apparatus of claim 15, wherein the power coupler is implemented as a multimode interference coupler (MMIC).

18. The optical transmission apparatus of claim 10, wherein the polarizing and combining element is implemented as a two-dimensional (2D) grating coupler.

* * * * *